(12) United States Patent
Iio (10) Patent No.: US 11,285,735 B2
(45) Date of Patent: Mar. 29, 2022

(54) MEDIUM, MEDIUM PRODUCING METHOD, AND MEDIUM PRODUCING APPARATUS

(71) Applicant: RICOH COMPANY, LTD., Tokyo (JP)

(72) Inventor: Masato Iio, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 11 days.

(21) Appl. No.: 16/599,657

(22) Filed: Oct. 11, 2019

(65) Prior Publication Data

US 2020/0130377 A1 Apr. 30, 2020

(30) Foreign Application Priority Data

Oct. 26, 2018 (JP) .............................. JP2018-201561
Jul. 18, 2019 (JP) .............................. JP2019-132890

(51) Int. Cl.
| | |
|---|---|
| *B41J 2/01* | (2006.01) |
| *B41J 3/407* | (2006.01) |
| *B41J 2/135* | (2006.01) |
| *B41J 3/28* | (2006.01) |
| *B65D 65/14* | (2006.01) |
| *C09D 11/38* | (2014.01) |

(52) U.S. Cl.
CPC ............... *B41J 3/407* (2013.01); *B41J 2/135* (2013.01); *B41J 3/28* (2013.01); *B65D 65/14* (2013.01); *C09D 11/38* (2013.01)

(58) Field of Classification Search
None
See application file for complete search history.

(56) References Cited

U.S. PATENT DOCUMENTS

| | | | |
|---|---|---|---|
| 9,017,779 B2* | 4/2015 | Ikeda ................... | B41M 5/5254 |
| | | | 428/32.17 |
| 9,108,439 B2* | 8/2015 | Toda ....................... | B41J 11/002 |
| 9,308,753 B2* | 4/2016 | Nakano ................ | B41M 5/0011 |
| 9,789,677 B2* | 10/2017 | Tsutsui .................. | B32B 37/025 |
| 2009/0129844 A1* | 5/2009 | Yamada ................. | B41J 15/044 |
| | | | 400/241 |
| 2014/0293297 A1* | 10/2014 | Nagahara ............... | B41J 29/393 |
| | | | 358/1.6 |

(Continued)

FOREIGN PATENT DOCUMENTS

| | | | |
|---|---|---|---|
| JP | 3861910 | | 10/2006 |
| JP | 2007090531 | A * | 4/2007 |
| JP | 2008-069327 | | 3/2008 |

(Continued)

OTHER PUBLICATIONS

Basic Physical Properties of PVOH (Year: 2020).*

(Continued)

*Primary Examiner* — Erica S Lin
*Assistant Examiner* — Tracey M McMillion
(74) *Attorney, Agent, or Firm* — Grüneberg and Myers PLLC (57) ABSTRACT

Provided is a medium including: a base material; and a print section over the base material, wherein the print section contains an alcohol compound having a boiling point of 180 degrees C. or higher and a viscosity of 30 mPa·s or lower at 25 degrees C., and wherein the medium includes an adhesive section containing an isocyanate compound.

11 Claims, 2 Drawing Sheets

(56) References Cited

U.S. PATENT DOCUMENTS

2018/0257104 A1* 9/2018 Che ................. C09D 11/30
2019/0375223 A1  12/2019 Rahimi et al.

FOREIGN PATENT DOCUMENTS

| JP | 2010-23265 A |   | 2/2010 |
|----|--------------|---|--------|
| JP | 3161611 U | * | 8/2010 |
| JP | 5062502 |   | 8/2012 |
| JP | 2013-180534 |   | 9/2013 |
| JP | 6229416 |   | 10/2017 |
| JP | 2018024853 A | * | 2/2018 |
| WO | WO 2016/146816 A2 |   | 9/2016 |
| WO | WO 2018/017307 A1 |   | 1/2018 |

OTHER PUBLICATIONS

Basic Physical Properties of PVOH Resin, Kuraray (Year: 2018).*
Koray Poval Technical Sheet (Year: 2018).*
Extended European Search Report dated Apr. 3, 2020 in Patent Application No. 19203688.7, 7 pages.

* cited by examiner

MEDIUM, MEDIUM PRODUCING METHOD, AND MEDIUM PRODUCING APPARATUS

CROSS-REFERENCE TO RELATED APPLICATIONS

The present application claims priority under 35 U.S.C. § 119 to Japanese Patent Application No. 2018-201561 filed Oct. 26, 2018 and Japanese Patent Application No. 2019-132890 filed Jul. 18, 2019. The contents of which are incorporated herein by reference in their entirety.

BACKGROUND OF THE INVENTION

Field of the Invention

The present disclosure relates to a medium, a medium producing method, and a medium producing apparatus.

Description of the Related Art

It is known to impart aesthetic properties and functional properties to soft packaging materials for, for example, food and everyday items, and building materials such as flooring, wall materials, and furniture materials by gravure printing or flexography. For example, there has been proposed a water-based gravure printing ink for lamination, where the ink has ink stability, and at the same time, a good light resistance when formed into a laminate product (for example, see Japanese Patent No. 6229416).

Meanwhile, there have been known techniques that enable low-volume printing by employing inkjet printing methods that do not use plates unlike the printing methods mentioned above. For example, there has been proposed an inkjet printing ink containing an aqueous urethane resin composition, a pigment, and a pigment dispersant (for example, see Japanese Patent No. 5062502).

SUMMARY OF THE INVENTION

According to one aspect of the present disclosure, a medium includes a base material and a print section over the base material. The print section contains an alcohol compound having a boiling point of 180 degrees C. or higher and a viscosity of 30 mPa·s or lower at 25 degrees C. The medium includes an adhesive section containing an isocyanate compound.

DESCRIPTION OF THE EMBODIMENTS (Medium)

A medium of the present disclosure includes a base material and a print section over the base material. The print section contains an alcohol compound having a boiling point of 180 degrees C. or higher and a viscosity of 30 mPa·s or lower at 25 degrees C. The medium includes an adhesive section containing an isocyanate compound. The medium further includes other sections as needed.

The present disclosure has an object to provide a medium excellent in adhesiveness between a base material and a print section.

The present disclosure can provide a medium excellent in adhesiveness between a base material and a print section.

The existing technique of simply forming a print section over a base material by an inkjet method, as described in Japanese Patent No. 5062502, has a problem that adhesiveness between the base material and the print section is insufficient.

Hence, according to the medium of the present disclosure, the print section contains the alcohol compound having a boiling point of 180 degrees C. or higher and a viscosity of 30 mPa·s or lower at 25 degrees C., and the medium includes the adhesive section containing the isocyanate compound that undergoes a cross-linking reaction with the alcohol compound. Therefore, a hydroxyl group of the alcohol compound in the print section and the isocyanate compound in the adhesive section undergo a cross-linking reaction with each other to form a cross-linked structure, leading to a drastic improvement of adhesiveness between the base material and the print section.

The medium of the present disclosure includes a base material, a print section over the base material, and an adhesive section, preferably includes a laminate section, and further includes other sections as needed.

<Base Material>

For example, the material, shape, structure, and thickness of the base material are not particularly limited and may be appropriately selected depending on the intended purpose. It is preferable to provide an adhesive section over the base material when forming a print section over the base material.

The base material is not particularly limited and may be appropriately selected depending on the intended purpose. Examples of the base material include polyethylene terephthalate (PET) films, polyethylene terephthalate/isophthalate copolymer films, polybutylene terephthalate films, polyethylene films, polypropylene films, polyamide films, polyimide films, triacetyl cellulose films, polyvinyl chloride films, vinylidene chloride/vinyl chloride copolymer films, acrylic resin films, and polyether sulfone films.

It is preferable to apply a surface treatment to the base material. The surface treatment is not particularly limited and may be appropriately selected depending on the intended purpose. Examples of the surface treatment include a glow discharge treatment, an ultraviolet irradiation treatment, a corona treatment, a flame treatment, and an acid or alkaline treatment.

The average thickness of the base material is not particularly limited, may be appropriately selected depending on the intended purpose, and is preferably 5 micrometers or greater but 500 micrometers or less and more preferably 10 micrometers or greater but 200 micrometers or less.

<Adhesive Section>

The adhesive section is provided over the base material when providing a print section over the base material.

Above all, it is preferable to provide the adhesive section over the base material, and along with this providing, form a print section over the adhesive section, because applying an ink over an undried adhesive section improves adhesiveness because applying an ink while the adhesive liquid applied over the base material is remaining liquid (i.e., before the adhesive liquid dries) causes both of the components to permeate and mix with each other and promotes a cross-linking reaction (urethane reaction) between the alcohol compound in the ink and the isocyanate compound in the adhesive section.

The method for providing the adhesive section over the base material when forming a print section over the base material will be described in an adhesive section forming step of a medium producing method described below.

The adhesive section contains an isocyanate compound, preferably contains a resin component, and further contains other components as needed.

—Isocyanate Compound—

It is preferable that the isocyanate compound undergo a cross-linking reaction with the alcohol compound contained in a print section to form a cross-linked structure. Use of the isocyanate compound is preferable in terms of adhesiveness between the base material and a print section, and because the isocyanate compound contained in the adhesive section and having reactivity with the alcohol compound contained in the ink can undergo a sufficient cross-linking and realize an excellent adhesiveness.

Preferable examples of the isocyanate compound include isocyanate compounds having a hexamethylene diisocyanate (HDI) structure in terms of low yellowing.

—Resin Component—

The resin component is not particularly limited and may be appropriately selected depending on the intended purpose. Examples of the resin component include polyurethane resins, acrylic resins, and alkyd/polyester resins. One of these resin components may be used alone or two or more of these resin components may be used in combination. Among these resin components, aqueous polyurethane resins having a high environmental durability and a high safety are preferable.

<Print Section>

The print section contains the alcohol compound having a boiling point of 180 degrees C. or higher and a viscosity of 30 mPa·s or lower at 25 degrees C., preferably contains a coloring material and additives and further contains other components as needed. Details of the coloring material and the additives will be described below in the description about the ink.

—Alcohol Compound—

The alcohol compound contained in the print section contains a hydroxyl group. This hydroxyl group and the isocyanate group of the isocyanate compound contained in the adhesive section undergo a cross-linking reaction with each other and form a cross-linked structure, to improve adhesiveness between the base material and the print section. A cross-linking reaction refers to formation of a urethane bond.

The boiling point of the alcohol compound is 180 degrees C. or higher, preferably 200 degrees C. or higher, more preferably 230 degrees C. or higher, and yet more preferably 290 degrees C. or higher. The upper limit of the boiling point is preferably 400 degrees C. or lower. Because the alcohol compound having a boiling point of 180 degrees C. or higher is contained in the ink for forming the print section, even if the ink is discharged for a long time, it is possible to suppress rapid drying of the ink near the nozzles of an inkjet head and accompanying clogging of the nozzles. This makes it possible to realize a good discharging stability and a good image quality. Moreover, the alcohol compound having a boiling point of 180 degrees C. or higher can be suppressed from being evaporated and generating bubbles in a heating step and a laminate section forming step. This makes it possible to effectively prevent adhesiveness degradation in the medium.

The viscosity of the alcohol compound at 25 degrees C. is 30 mPa·s or lower, preferably 15 mPa·s or lower, and more preferably 4 mPa·s or higher but 13 mPa·s or lower. When the viscosity of the alcohol compound is 30 mPa·s or lower, the viscosity of the ink prepared with the alcohol compound is in a viscosity range suitable for discharging by an inkjet head. This makes it possible to realize a good discharging stability and a good image quality.

The alcohol compound is not particularly limited and may be appropriately selected depending on the intended purpose, so long as the alcohol compound satisfies the boiling point and the viscosity at 25 degrees C. mentioned above. Examples of the alcohol compound include: straight-chain alcohols such as lauryl alcohol (with a boiling point of 259 degrees C.), cetyl alcohol (with a boiling point of 190 degrees C.), stearyl alcohol (with a boiling point of 210 degrees C.), behenyl alcohol (with a boiling point of 180 degrees C.), myristyl alcohol (with a boiling point of 260 degrees C.), and oleyl alcohol (with a boiling point of 207 degrees C.); divalent alcohols such as ethylene glycol (with a boiling point of 197 degrees C.), propylene glycol (with a boiling point of 188 degrees C.), trimethylene glycol (with a boiling point of 287 degrees C.), 1,2-butanediol (with a boiling point of 194 degrees C.), 1,3-butanediol (with a boiling point of 207 degrees C.), tetramethylene glycol, tetraethylene glycol (with a boiling point of 328 degrees C.), 2,3-butylene glycol (with a boiling point of 180 degrees C.), pentamethylene glycol (with a boiling point of 239 degrees C.), 2-butene-1,4-diol (with a boiling point of 235 degrees C.), hexylene glycol (with a boiling point of 197 degrees C.), and octylene glycol; multivalent alcohol polymers such as diethylene glycol (with a boiling point of 244 degrees C.), dipropylene glycol (with a boiling point of 231 degrees C.), triethylene glycol (with a boiling point of 276 degrees C.), polyethylene glycol monomethyl ether (with a boiling point of from 290 degrees C. through 310 degrees C.), and tripropylene glycol methyl ether (with a boiling point of 242 degrees C.); divalent alcohol alkyl ethers such as ethylene glycol monophenyl ether (with a boiling point of 237 degrees C.), ethylene glycol monohexyl ether (with a boiling point of 205 degrees C.), ethylene glycol mono 2-methyl hexyl ether (with a boiling point of 229 degrees C.), ethylene glycol isoamyl ether, ethylene glycol benzyl ether (with a boiling point of 256 degrees C.), propylene glycol phenyl ether (with a boiling point of 243 degrees C.), and tripropylene glycol monobutyl ether (with a boiling point of 274 degrees C.); divalent alcohol alkyl ethers such as diethylene glycol monomethyl ether (with a boiling point of 193 degrees C.), diethylene glycol monoethyl ether (with a boiling point of 196 degrees C.), diethylene glycol monobutyl ether (with a boiling point of 230 degrees C.), triethylene glycol monomethyl ether (with a boiling point of 248 degrees C.), triethylene glycol monoethyl ether (with a boiling point of 255 degrees C.), dipropylene glycol monomethyl ether (with a boiling point of 188 degrees C.), dipropylene glycol ethyl ether, and dipropylene glycol butyl ether (with a boiling point of 222 degrees C.); and xyl alcohol. One of these alcohol compounds may be used alone or two or more of these alcohol compounds may be used in combination.

Among these alcohol compounds, polyethylene glycol monomethyl ether, tripropylene glycol methyl ether, propylene glycol phenyl ether, tripropylene glycol monobutyl ether, and dipropylene glycol monomethyl ether are preferable because these alcohol compounds have a low viscosity.

The content of the alcohol compound is preferably 60% by mass or greater, more preferably 65% by mass or greater, yet more preferably 80% by mass or greater, and particularly preferably 90% by mass or greater relative to the total of the print section. When the content of the alcohol compound is 60% by mass or greater, the ratio of a solidified content in the print section can be increased. This makes it possible to suppress generation of bubbles due to evaporation of any unsolidified liquid in a heating step and a laminate section forming step, and to effectively suppress adhesiveness degradation in the medium as a result.

The alcohol compound contained in the print section has a boiling point of 180 degrees C. or higher, does not evaporate in a heating step and a laminate section forming step, and is present in the print section in the content mentioned above. The alcohol compound contained in the print section of the medium can be detected by an analysis by, for example, GC-MS or LC-MS.

<Laminate Section>

The laminate section is provided for improving image qualities based on improvement of image fastness of the print section such as light resistance, water resistance, and abrasion resistance, and improvement of glossiness and smoothness of the image surface and the maximum density of the image.

The laminate material is not particularly limited and may be appropriately selected depending on the intended purpose. Examples of the laminate material include films and sheets formed of materials such as polyester such as polyethylene terephthalate (PET), polyethylene terephthalate/isophthalate copolymers, and polybutylene terephthalate, polyolefin such as polyethylene and polypropylene, polyamide, polyimide, triacetyl cellulose, polyvinyl chloride, vinylidene chloride-vinyl chloride copolymers, acrylic resins, and polyether sulfone.

The average thickness of the laminate section is not particularly limited, may be appropriately selected depending on the intended purpose, and is preferably 5 micrometers or greater but 50 micrometers or less and more preferably 10 micrometers or greater but 40 micrometers or less in terms of cost efficiency and hardness for wrinkles to occur.

<Other Sections>

The other sections are not particularly limited and may be appropriately selected depending on the intended purpose. Examples of the other sections include a protective section and an intermediate section.

The medium of the present disclosure is excellent in adhesiveness between the base material and the print section, has an excellent laminate strength, and can be prevented from yellowing. Therefore, the medium is suitably used for various purposes such as soft packaging materials for, for example, food and everyday items, building materials such as flooring, wall materials, and tiles, and furniture materials, cloths for clothing such as T-shirts, textiles, and leather.

Figure 3:
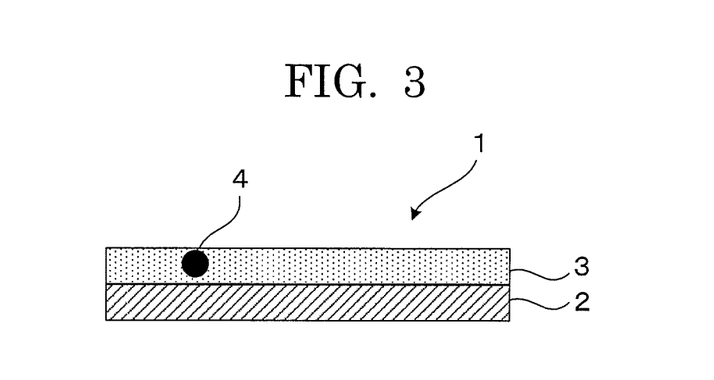
FIG. 3 is a schematic view illustrating an example of a medium of the present disclosure.

FIG. 3 is a schematic view illustrating an example of the medium of the present disclosure. The medium 1 of FIG. 3 includes an adhesive section 3 and a print section 4 over a base material 2.

Figure 4:
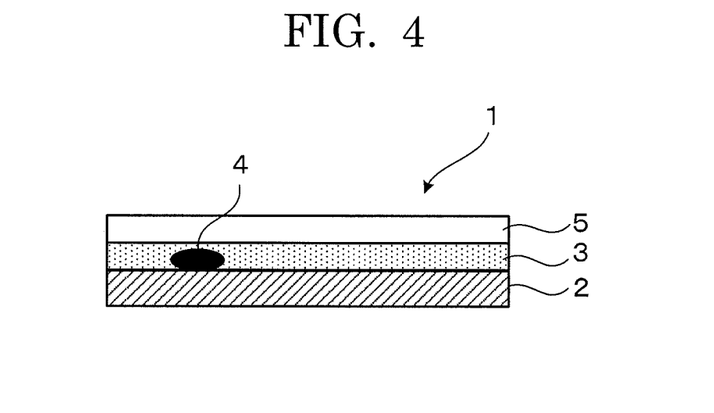
FIG. 4 is a schematic view illustrating another example of a medium of the present disclosure.

FIG. 4 is a schematic view illustrating another example of the medium of the present disclosure. The medium 1 of FIG. 4 includes an adhesive section 3, a print section 4, and a laminate section 5 over a base material 2. In the medium 1 of FIG. 4, the print section 4 is in contact with the base material 2 because the adhesive section 3 is provided after the print section 4 is formed over the base material 2.

Figure 5:
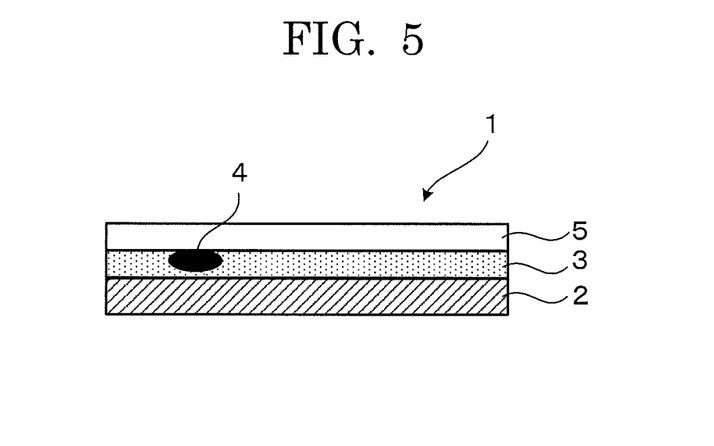
FIG. 5 is a schematic view illustrating another example of a medium of the present disclosure.

FIG. 5 is a schematic view illustrating another example of the medium of the present disclosure. The medium 1 of FIG. 5 includes an adhesive section 3, a print section 4, and a laminate section 5 over a base material 2. In this medium 1 of FIG. 5, the print section 4 is in contact with the laminate section 5 because the print section 4 is provided after the adhesive section 3 is formed over the base material 2.

(Medium Producing Method and Medium Producing Apparatus)

A medium producing method of the present disclosure preferably includes a print section forming step, a heating step, an adhesive section forming step, and a laminate section forming step, and further includes other steps as needed.

A medium producing apparatus of the present disclosure preferably includes a print section forming unit, a heating unit, an adhesive section forming unit, and a laminate section forming unit, and further includes other units as needed.

<Print Section Forming Step and Print Section Forming Unit>

The print section forming step is a step of forming a print section by applying an ink containing the alcohol compound having a boiling point of 180 degrees C. or higher and a viscosity of 30 mPa·s or lower at 25 degrees C. over the base material. The print section forming step is performed by the print section forming unit.

The method for forming the print section is not particularly limited and may be appropriately selected depending on the intended purpose. Examples of the method include a gravure method, a flexography method, an offset method, and an inkjet method. Among these methods, an inkjet method is preferable.

The ink is applied over the base material or the adhesive section by the method mentioned above. Because an adhesive section formed over the base material is in a wet state, an inkjet method, which is a contactless printing method, is preferable as the method for forming the print section.

<<Ink>>

The ink used in the present disclosure contains an alcohol compound having a boiling point of 180 degrees C. or higher and a viscosity of 30 mPa·s or lower at 25 degrees C., a coloring material, and additives. The ink may contain any other organic solvent than the alcohol compound. The alcohol compound is as described above in the description about the print section of the medium.

—Coloring Material—

The coloring material has no particular limit. For example, pigments and dyes are suitable.

The pigment includes inorganic pigments and organic pigments. These can be used alone or in combination. In addition, it is possible to use a mixed crystal.

As the pigments, for example, black pigments, yellow pigments, magenta pigments, cyan pigments, white pigments, green pigments, orange pigments, gloss pigments of gold, silver, etc., and metallic pigments can be used.

As the inorganic pigments, in addition to titanium oxide, iron oxide, calcium carbonate, barium sulfate, aluminum hydroxide, barium yellow, cadmium red, and chrome yellow, carbon black manufactured by known methods such as contact methods, furnace methods, and thermal methods can be used.

As the organic pigments, it is possible to use azo pigments, polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinophthalone pigments, etc.), dye chelates (basic dye type chelates, acid dye type chelates, etc.), nitro pigments, nitroso pigments, and aniline black. Of these pigments, pigments having good affinity with solvents are preferable. Also, hollow resin particles and inorganic hollow particles can be used.

Specific examples of the pigments for black include, but are not limited to, carbon black (C.I. Pigment Black 7) such as furnace black, lamp black, acetylene black, and channel black, metals such as copper, iron (C.I. Pigment Black 11), and titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 138, 150, 153, 155, 180, 185, and 213; C.I. Pigment Orange 5, 13, 16, 17, 36, 43, and 51; C.I. Pigment Red 1, 2, 3, 5, 17, 22, 23, 31, 38, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 184, 185, 190, 193, 202, 207, 208, 209, 213, 219, 224, 254, and 264; C.I. Pigment Violet 1 (Rhodamine Lake), 3, 5:1, 16, 19, 23, and 38; C.I. Pigment Blue 1, 2, 15 (Phthalocyanine Blue), 15:1, 15:2, 15:3, 15:4 (Phthalocyanine Blue), 16, 17:1, 56, 60, and 63; and C.I. Pigment Green 1, 4, 7, 8, 10, 17, 18, and 36.

The type of dye is not particularly limited and includes, for example, acidic dyes, direct dyes, reactive dyes, and basic dyes. These can be used alone or in combination.

Specific examples of the dye include, but are not limited to, C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C. I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

The content of the coloring material in ink is preferably from 0.1% by mass through 15% by mass and more preferably from 1% by mass through 10% by mass in terms of enhancement of image density, fixability, and discharging stability.

To obtain the ink, the pigment is dispersed by, for example, preparing a self-dispersible pigment by introducing a hydrophilic functional group into the pigment, coating the surface of the pigment with resin, or using a dispersant.

To prepare a self-dispersible pigment by introducing a hydrophilic functional group into a pigment, for example, it is possible to add a functional group such as sulfone group and carboxyl group to the pigment (e.g., carbon) to disperse the pigment in water.

To coat the surface of the pigment with resin, the pigment is encapsulated by microcapsules to make the pigment dispersible in water. This can be referred to as a resin-coated pigment. In this case, the pigment to be added to ink is not necessarily wholly coated with resin. Pigments partially or wholly uncovered with resin may be dispersed in the ink unless the pigments have an adverse impact.

To use a dispersant, for example, a known dispersant of a small molecular weight type or a high molecular weight type represented by a surfactant is used to disperse the pigments in ink.

As the dispersant, it is possible to use, for example, anionic surfactants, cationic surfactants, nonionic surfactants, amphoteric surfactants, etc. depending on the pigments.

Also, a nonionic surfactant (RT-100, manufactured by TAKEMOTO OIL & FAT CO., LTD.) and a formalin condensate of naphthalene sodium sulfonate are suitable as dispersants.

These dispersants can be used alone or in combination.

—Pigment Dispersion—

The ink can be obtained by mixing a pigment with materials such as water and organic solvent. It is also possible to mix a pigment with water, a dispersant, etc., first to prepare a pigment dispersion and thereafter mix the pigment dispersion with materials such as water and organic solvent to manufacture ink.

The pigment dispersion is obtained by mixing and dispersing water, pigment, pigment dispersant, and other optional components and adjusting the particle diameter. It is good to use a dispersing device for dispersion.

The particle diameter of the pigment in the pigment dispersion has no particular limit. For example, the maximum frequency in the maximum number conversion is preferably from 20 through 500 nm and more preferably from 20 through 150 nm to improve dispersion stability of the pigment and ameliorate the discharging stability and image quality such as image density.

The particle diameter of the pigment can be measured using a particle size analyzer (Nanotrac Wave-UT151, manufactured by MicrotracBEL Corp).

In addition, the content of the pigment in the pigment dispersion is not particularly limited and can be suitably selected to suit a particular application. In terms of improving discharging stability and image density, the content is preferably from 0.1 through 50% by mass and more preferably from 0.1 through 30% by mass.

During the production, coarse particles are optionally filtered off from the pigment dispersion with a filter, a centrifuge, etc. preferably followed by degassing.

—Water—

The content of water in the ink is not particularly limited, may be appropriately selected depending on the intended purpose, and may be 0% by mass or greater but 90% by mass or less. The content of water in the ink is preferably 0% by mass or greater but 40% by mass or less, more preferably 0% by mass or greater but 30% by mass or less, and yet more preferably 0% by mass or greater but 25% by mass or less.

When the content of water is low, the content of the alcohol compound can be high. Therefore, even if the ink is discharged for a long time, it is possible to suppress rapid drying near the nozzles of an inkjet head and accompanying clogging of the nozzles. This makes it possible to realize a good discharging stability and a good image quality. Moreover, when the content of water is low, it is possible to reduce the amount of liquid that may remain unsolidified in a step of solidifying the adhesive section. This makes it possible to suppress generation of bubbles due to evaporation of any unsolidified water in a step of producing the medium by heating and pressing described below, and to suppress adhesiveness degradation in the medium as a result.

Hence, the content of water is preferably in the range described above. However, the water may not be contained in the ink.

—Additives—

Ink may further optionally contain a surfactant, a defoaming agent, a preservative and fungicide, a corrosion inhibitor, a pH regulator, a catalyst, etc.

——Surfactant——

Examples of the surfactant are silicone-based surfactants, fluorosurfactants, amphoteric surfactants, nonionic surfactants, anionic surfactants, etc.

The silicone-based surfactant has no specific limit and can be suitably selected to suit to a particular application. Of these silicone-based surfactants, preferred are silicone-based surfactants which are not decomposed even in a high pH environment. Specific examples thereof include, but are not limited to, side-chain-modified polydimethylsiloxane, both end-modified polydimethylsiloxane, one-end-modified polydimethylsiloxane, and side-chain-both-end-modified polydimethylsiloxane. A silicone-based surfactant having a polyoxyethylene group or a polyoxyethylene polyoxypropylene group as a modifying group is particularly preferable because such an agent demonstrates good characteristics as an aqueous surfactant. It is possible to use a polyether-modified silicone-based surfactant as the silicone-based surfactant. A specific example thereof is a compound in which a polyalkylene oxide structure is introduced into the side chain of the Si site of dimethyl siloxane.

Specific examples of the fluoro surfactants include, but are not limited to, perfluoroalkyl sulfonic acid compounds, perfluoroalkyl carboxylic acid compounds, perfluoroalkyl phosphoric acid ester compounds, adducts of perfluoroalkyl ethylene oxide, and polyoxyalkylene ether polymer compounds having a perfluoroalkyl ether group in its side chain. These fluoro surfactants are particularly preferable because these fluoro surfactants do not foam easily. Specific examples of the perfluoroalkyl sulfonic acid compounds include, but are not limited to, perfluoroalkyl sulfonic acid and salts of perfluoroalkyl sulfonic acid. Specific examples of the perfluoroalkyl carboxylic acid compounds include, but are not limited to, perfluoroalkyl carboxylic acid and salts of perfluoroalkyl carboxylic acid. Specific examples of the polyoxyalkylene ether polymer compounds having a perfluoroalkyl ether group in its side chain include, but are not limited to, sulfuric acid ester salts of polyoxyalkylene ether polymer having a perfluoroalkyl ether group in its side chain and salts of polyoxyalkylene ether polymers having a perfluoroalkyl ether group in its side chain. Counter ions of salts in these fluorine-based surfactants are, for example, Li, Na, K, $NH_4$, $NH_3CH_2CH_2OH$, $NH_2(CH_2CH_2OH)_2$, and $NH(CH_2CH_2OH)_3$.

Specific examples of the amphoteric surfactants include, but are not limited to, lauryl aminopropionic acid salts, lauryl dimethyl betaine, stearyl dimethyl betaine, and lauryl dihydroxyethyl betaine.

Specific examples of the nonionic surfactants include, but are not limited to, polyoxyethylene alkyl phenyl ethers, polyoxyethylene alkyl esters, polyoxyethylene alkyl amines, polyoxyethylene alkyl amides, polyoxyethylene propylene block polymers, sorbitan aliphatic acid esters, polyoxyethylene sorbitan aliphatic acid esters, and adducts of acetylene alcohol with ethylene oxides, etc.

Specific examples of the anionic surfactants include, but are not limited to, polyoxyethylene alkyl ether acetates, dodecyl benzene sulfonates, laurates, and polyoxyethylene alkyl ether sulfates.

These surfactants can be used alone or in combination.

The silicone-based surfactants have no particular limit and can be suitably selected to suit to a particular application. Specific examples thereof include, but are not limited to, side-chain-modified polydimethyl siloxane, both end-modified polydimethylsiloxane, one-end-modified polydimethylsiloxane, and side-chain-both-end-modified polydimethylsiloxane. In particular, a polyether-modified silicone-based surfactant having a polyoxyethylene group or a polyoxyethylene polyoxypropylene group as a modifying group is particularly preferable because such a surfactant demonstrates good characteristics as an aqueous surfactant.

Any suitably synthesized surfactant and any product thereof available on the market is suitable. Products available on the market are obtained from Byk Chemie Japan Co., Ltd., Shin-Etsu Chemical Co., Ltd., Dow Corning Toray Silicone Co., Ltd., NIHON EMULSION Co., Ltd., Kyoeisha Chemical Co., Ltd., etc.

The polyether-modified silicone-based surfactant has no particular limit and can be suitably selected to suit to a particular application. Examples thereof include a compound in which the polyalkylene oxide structure represented by the following general formula S-1 is introduced into the side chain of the Si site of dimethyl polysiloxane.

General formula S-1

In the general formula S-1, "m", "n", "a", and "b" each respectively represent integers, R represents an alkylene group, and R' represents an alkyl group.

Products available on the market may be used as the polyether-modified silicone-based surfactants. Specific examples of the products available on the market include, but are not limited to, KF-618, KF-642, and KF-643 (all manufactured by Shin-Etsu Chemical Co., Ltd.), EMALEX-SS-5602 and SS-1906EX (both manufactured by NIHON EMULSION Co., Ltd.), FZ-2105, FZ-2118, FZ-2154, FZ-2161, FZ-2162, FZ-2163, and FZ-2164 (all manufactured by Dow Corning Toray Silicone Co., Ltd.), BYK-33 and BYK-387 (both manufactured by Byk Chemie Japan Co., Ltd.), and TSF4440, TSF4452, and TSF4453 (all manufactured by Toshiba Silicone Co., Ltd.).

A fluorosurfactant in which the number of carbon atoms replaced with fluorine atoms is from 2 through 16 and more preferably from 4 through 16 is preferable.

Specific examples of the fluorosurfactants include, but are not limited to, perfluoroalkyl phosphoric acid ester compounds, adducts of perfluoroalkyl ethylene oxide, and polyoxyalkylene ether polymer compounds having a perfluoroalkyl ether group in its side chain.

Of these fluorosurfactants, polyoxyalkylene ether polymer compounds having a perfluoroalkyl ether group in its side chain are preferable because these compounds do not foam easily and the fluorosurfactant represented by the following general formula F-1 or general formula F-2 is more preferable.

[General formula (F-1)]

In the general formula F-1, "m" is preferably an integer of from 0 through 10 and "n" is preferably an integer of from 0 through 40 in order to provide water solubility.

[General formula (F-2)]

In general formula F-2, Y represents H, $C_mF_{2m+1}$, where "m" is an integer of from 1 through 6, $CH_2CH(OH)CH_2-C_mF_{2m+1}$, where m represents an integer of from 4 through 6, or $C_pH_{2p+1}$, where p represents an integer of from 1 through 19. "n" represents an integer of from 1 through 6. "a" represents an integer of from 4 through 14.

The content of the surfactant in ink is not particularly limited and can be suitably selected to suit to a particular application. It is preferably from 0.001% by mass through 5% by mass and more preferably from 0.05% by mass through 5% by mass in terms of excellent wettability and dischargeability and improvement on image quality.

——Defoaming Agent——

The defoaming agent has no particular limit. For example, silicon-based defoaming agents, polyether-based defoaming agents, and aliphatic acid ester-based defoaming agents are suitable. These defoaming agents can be used alone or in combination. Of these defoaming agents, silicone-based defoaming agents are preferable to easily break foams.

——Preservatives and Fungicides——

The preservatives and fungicides are not particularly limited. A specific example is 1,2-benzisothiazolin-3-on.

——Corrosion Inhibitor——

The corrosion inhibitor has no particular limit Examples thereof are acid sulfite and sodium thiosulfate.

——pH Regulator——

The pH regulator has no particular limit. It is preferable to adjust the pH to 7 or higher. Specific examples thereof include, but are not limited to, amines such as diethanol amine and triethanol amine.

——Catalyst——

It is optional to add a catalyst in order to promote reaction between the hydroxyl group of the alcohol compound contained in the ink and the isocyanate group of the isocyanate compound contained in the base material or the adhesive section. The catalyst is not particularly limited and may be appropriately selected depending on the intended purpose. Examples of the catalyst include tertiary amine compounds and organometallic compounds.

<<Property of Ink>>

The property of the ink is not particularly limited and can be suitably selected to suit to a particular application. Examples of the property of the ink include viscosity and pH.

The viscosity of the ink at 25 degrees C. is preferably from 5 through 30 mPa·s and more preferably from 5 through 25 mPa·s to improve print density and text quality and obtain good dischargeability. The viscosity can be measured by, for example, a rotatory viscometer (RE-80L, manufactured by TOKI SANGYO CO., LTD.). The measuring conditions are as follows:

Standard cone rotor (1°34'×R24)
Sample liquid amount: 1.2 mL
Number of rotations: 50 rotations per minute (rpm)
25 degrees C.
Measuring time: three minutes The pH of the ink is preferably from 7 through 12 and more preferably from 8 through 11 in terms of prevention of corrosion of metal materials contacting the ink.

<Adhesive Section Forming Step and Adhesive Section Forming Unit>

The adhesive section forming step is a step of applying an adhesive liquid containing an isocyanate compound over the base material to form an adhesive section. The adhesive section forming step is performed by the adhesive section forming unit.

The adhesive liquid contains an isocyanate compound that undergoes a cross-linking reaction with an alcohol compound, and a resin component, and further contains other components as needed.

The isocyanate compound and the resin component are as described above in the description about the adhesive section of the medium.

Preferable specific examples of the adhesive liquid include a 1K polyurethane resin and a 2K polyurethane resin.

Examples of the 1K polyurethane resin include a moisture-curable type that cures by reacting with moisture in the air, a block type that has a masked structure of an active isocyanate compound and is cured by heating, and a lacquer type that forms a film through volatilization of a solvent.

A typical example of the 2K polyurethane resin is a type in which a polyol compound, which is a main agent, and a polyisocyanate compound, which is a curing agent, are mixed. Curability, close adhesiveness, and flexibility suited to the intended purpose are available depending on combination of a polyol compound and a polyisocyanate compound.

The method for applying the adhesive liquid is not particularly limited and may be appropriately selected depending on the intended purpose. Examples of the method include a roll coating method, a spray coating method, a die coating method, a calender coating method, a spin coating method, and an inkjet method. Among these methods, the roll coating method and the inkjet method that can make a film thickness uniform are preferable.

<<Heating Step and Heating Unit>>

The heating step is a step of heating the base material over which the print section is formed. The heating step is performed by the heating unit. In the case of forming a print section over an adhesive section after forming the adhesive section over the base material, the base material over which the adhesive section and the print section have been formed is heated.

Examples of the heating unit include an infrared heater, a hot air heater, a heating roller, a hot plate, a high-frequency heater, and a microwave heater. One of these heating units may be used alone or two or more of these heating units may be used in combination.

The method for heating a recording medium is not particularly limited and may be appropriately selected depending on the intended purpose. Examples of the method include a method of bringing a heated fluid such as hot air serving as a heating unit into contact with a recording medium to which an ink has been applied, a method of bringing a recording medium to which an ink has been applied and a heating member into contact with each other to heat the recording medium by heat transfer, and a method of heating a recording medium to which an ink has been applied by irradiating the recording medium with energy rays such as infrared rays and far-infrared rays.

The heating temperature in the heating step is preferably 70 degrees C. or higher but 220 degrees C. or lower and more preferably 100 degrees C. or higher but 200 degrees C. or lower.

The heating time in the heating step is preferably 1 minute or longer but 60 minutes or shorter.

<Laminate Section Forming Step and Laminate Section Forming Unit>

The laminate section forming step is a step of heating and pressing a laminate material over the print section to form a laminate section. The laminate section forming step is performed by the laminate section forming unit.

The laminate section forming step is performed after the heating step.

Laminate materials mentioned in the description about the laminate section can be used as the laminate material.

Laminate treatment conditions may be appropriately selected depending on the kind of the laminate material. The heating unit, the heating temperature, and the heating time are the same as in the heating step. By lamination, a medium in which the base material and the print section, or the base material, the adhesive section, and the print section are firmly integrated with the laminate material can be obtained.

<Other Steps and Other Units>

The other steps are not particularly limited and may be appropriately selected depending on the intended purpose. Examples of the other steps include a controlling step.

The other units are not particularly limited and may be appropriately selected depending on the intended purpose. Examples of the other units include a controlling unit.

Figure 1:
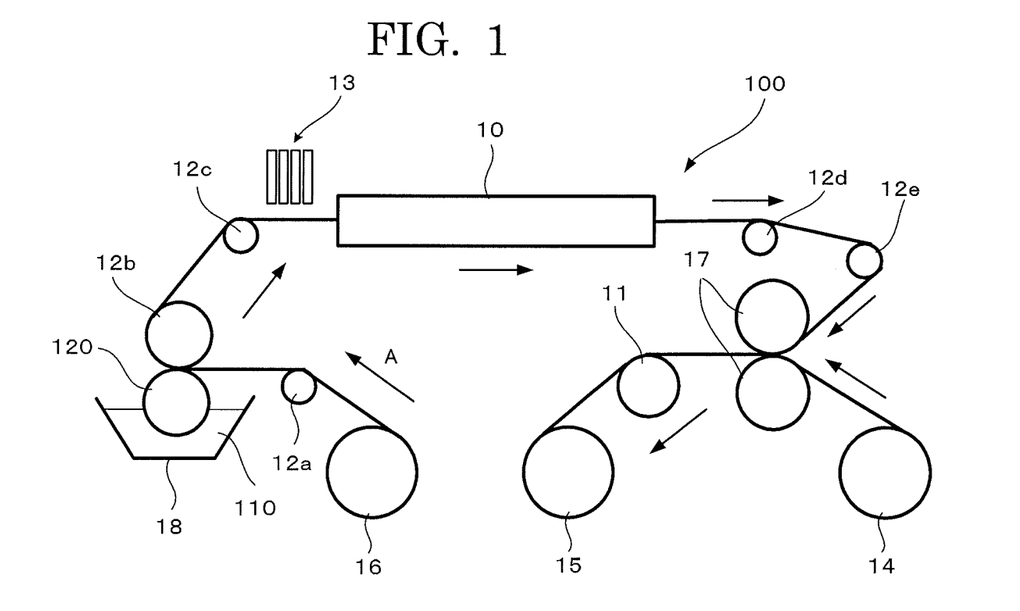
FIG. 1 is a schematic view illustrating an example of a medium producing apparatus of the present disclosure.

A medium producing apparatus of the present disclosure will be described with reference to the drawings. FIG. 1 is a schematic view illustrating an example of the medium producing apparatus of the present disclosure. The medium producing apparatus 100 illustrated in FIG. 1 includes a base material feeding unit 16, conveying rollers 12a, 12b, 12c, 12d, and 12e, an adhesive liquid supplying unit 18, an ink discharging head 13, a heating unit 10, a laminate material feeding unit 14, a heating/pressing unit 17, and a product take-up roller 15.

The base material feeding unit 16 is driven to rotate to feed the base material in a conveying direction indicated by an arrow A in FIG. 1. The base material feeding unit 16 is not limited to a self-driven conveying type, but may also be a conveying type that rotates by following a separate driving unit.

The conveying rollers 12a, 12b, 12c, 12d, and 12e are driven to rotate to convey the base material, which has been fed into the medium producing apparatus 100, along a conveying path in the medium producing apparatus 100. Each of the conveying rollers 12a, 12b, 12c, 12d, and 12e is not limited to a self-driven conveying type, but may be a conveying type that rotates by following a separate driving unit.

The adhesive liquid supplying unit 18 retains an adhesive liquid 110 inside. While the base material is conveyed on the conveying path along which the adhesive liquid 110 is supplied from the adhesive liquid supplying unit 18, an adhesive liquid supplying roller 120 applies the adhesive liquid 110 containing an isocyanate compound over the base material, to form an adhesive section over the base material.

The ink discharging head 13 includes a plurality of nozzle lines in each of which a plurality of nozzles are arranged. The ink discharging head 13 is provided to have the nozzles, from which an ink is discharged, face the base material conveying path. Hence, the ink discharging head 13 sequentially discharges liquid inks of, for example, magenta (M), cyan (C), black (K), and yellow (Y) and forms a print section.

The ink discharging head 13 may discharge a liquid by a pressure generated by a pressure generating unit.

A liquid discharging mechanism of the ink discharging head 13 is not particularly limited and may be appropriately selected depending on the intended purpose. Examples of the liquid discharging mechanism include a piezoelectric actuator (which may use a multilayer piezoelectric element), a thermal actuator using an electrothermal transducer such as heat resistor, and an electrostatic actuator formed of a vibration plate and a counter electrode.

The heating unit 10 is configured to heat a medium over which a print section and an adhesive section are formed. As a result, the print section and the adhesive section over the base material are solidified.

The laminate material fed from the laminate material feeding unit 14 is laminated over the printed surface of the medium heated by the heating unit 10, and heated and pressed by the heating/pressing unit 17. As a result, the laminate material is crimped.

The medium to which the laminate treatment has been applied is cooled by a cooling roller 11 and taken up by the product take-up roller 15.

Figure 2:
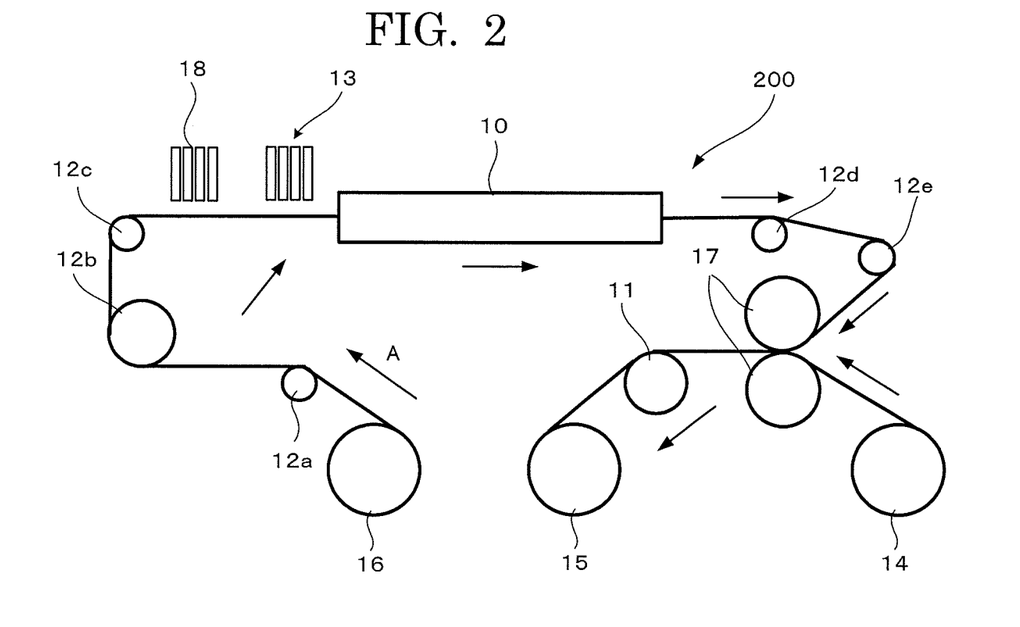
FIG. 2 is a schematic view illustrating another example of a medium producing apparatus of the present disclosure.

FIG. 2 is a schematic view illustrating another example of the medium producing apparatus of the present disclosure. The medium producing apparatus 200 illustrated in FIG. 2 including a base material feeding unit 16, conveying rollers 12, an ink discharging head 13, a heating unit 10, a laminate material feeding unit 14, a heating/pressing unit 17, and a product take-up roller 15 is the same as the medium producing apparatus 100 illustrated in FIG. 1, except that the medium producing apparatus 200 uses an inkjet head as an adhesive liquid supplying unit 18. Hence, the same components as in FIG. 1 will be denoted by the same reference numerals, and descriptions about such components will be skipped.

Terms such as image formation, recording, and printing as used herein are intended to mean the same meaning. Terms such as base material, recording medium, medium, and printed matter are intended to mean the same meaning.

EXAMPLES

The present disclosure will be described below by way of Examples. The present disclosure should not be construed as being limited to these Examples.

Ink Production Example 1

—Production of Ink 1—

A mixture according to the ink prescription described below was pre-mixed, subsequently subjected to circulation dispersion for 7 hours using a disk-type bead mill (available from Shinmaru Enterprises Corporation, KDL TYPE, using zirconia balls having a diameter of 0.3 mm as media), and subsequently filtrated through a polypropylene filter having an average pore diameter of 0.2 micrometers, to produce an ink 1.

[Ink Prescription]
Carbon black pigment (REGAL 400R, available from Cabot Corporation): 6% by mass
Pigment dispersant (SOLSPERSE 39000, available from Lubrizol Corporation: 2.5% by mass Anionic surfactant (PIONINE A-51-B, available from Takemoto Oil & Fat Co., Ltd.): 0.5% by mass
Nonionic surfactant (ZONYL FS-300, available from Du Pont Kabushiki Kaisha): 1% by mass
Alcohol compound (polyethylene glycol monomethyl ether, HYMOL PM, available from Toho Chemical Industry Co., Ltd.): 80% by mass
Ion-exchanged water: 10% by mass Ink Production Examples 2 to 8

—Production of Inks 2 to 8—

Inks 2 to 8 were produced in the same manner as in Ink production example 1, except that the components and contents (% by mass) were changed as presented in Table 1 below.

<Measurement of Ink Viscosity>

Next, the viscosity of the obtained inks 1 to 8 at 25 degrees C. was measured using a cone-plate rotary viscometer available from TOKI SANGYO CO., LTD. The results are presented in Table 1. As a result, the viscosity of the inks 1 to 7 at 25 degrees C. was 30 mPa·s or lower and the inks 1 to 7 were inkjet-dischargeable.

The viscosity of the ink 8 at 25 degrees C. was 55 mPa·s, and the ink 8 was not inkjet-dischargeable. Therefore, evaluations presented in Table 2 to Table 4 were not performed (unmeasurable).

and a viscosity of 14.8 mPa·s at 25 degrees C., HYMOL PM, available from Toho Chemical Industry Co., Ltd.)
Tripropylene glycol monobutyl ether (with a boiling point of 274 degrees C. and a viscosity of 7.3 mPa·s at 25 degrees C., available from Tokyo Chemical Industry Co., Ltd.)
Tripropylene glycol methyl ether (with a boiling point of 242 degrees C. and a viscosity of 5.5 mPa·s at 25 degrees C., available from Tokyo Chemical Industry Co., Ltd.)
Propylene glycol phenyl ether (with a boiling point of 243 degrees C. and a viscosity of 23.8 mPa·s at 25 degrees C., available from Tokyo Chemical Industry Co., Ltd.)
Dipropylene glycol monomethyl ether (with a boiling point of 188 degrees C. and a viscosity of 1.1 mPa·s at 25 degrees C., available from Tokyo Chemical Industry Co., Ltd.)
Tetrahydrofurfuryl alcohol (with a boiling point of 178 degrees C. and a viscosity of 8 mPa·s at 25 degrees C., available from Tokyo Chemical Industry Co., Ltd.)
Octydodecanol (with a boiling point of 223 degrees C. and a viscosity of 50 mPa·s at 25 degrees C.)
Carbon black pigment (REGAL 400R, available from Cabot Corporation)
Pigment dispersant (SOLSPERSE 39000, available from Lubrizol Corporation)

TABLE 1

| | | Ink No. | | | | | | | |
|---|---|---|---|---|---|---|---|---|---|
| | Component | 1 | 2 | 3 | 4 | 5 | 6 | 7 | 8 |
| Pigment | Carbon black pigment | 6 | 6 | 6 | 6 | 6 | 6 | 6 | 6 |
| Pigment dispersant | SOLSPERSE 39000 | 2.5 | 2.5 | 2.5 | 2.5 | 2.5 | 2.5 | 2.5 | 2.5 |
| Alcohol compound | Polyethylene glycol monomethyl ether (boiling point: 290° C. through 310° C.) | 80 | | | | | 30 | | |
| | Tripropylene glycol monobutyl ether (boiling point: 274° C.) | | 80 | | | | 30 | | |
| | Tripropylene glycol methyl ether (boiling pint: 242° C.) | | | 80 | | | 20 | | |
| | Propylene glycol phenyl ether (boiling point 243° C.) | | | | 80 | | | | |
| | Dipropylene glycol monomethyl ether (boiling point: 188° C.) | | | | | 80 | | | |
| | Tetrahydrofurfuryl alcohol (boiling point: 178° C.) | | | | | | | 80 | |
| | Octydodecanol (boiling point: 223° C.) | | | | | | | | 80 |
| Surfactant | PIONINE A-51-B | 0.5 | 0.5 | 0.5 | 0.5 | 0.5 | 0.5 | 0.5 | 0.5 |
| | ZONYL FS-300 | 1 | 1 | 1 | 1 | 1 | 1 | 1 | 1 |
| Water | Ion-exchanged water | 10 | 10 | 10 | 10 | 10 | 10 | 10 | 10 |
| | Total (% by mass) | 100 | 100 | 100 | 100 | 100 | 100 | 100 | 100 |
| | Viscosity (mPa · s, 25° C.) | 15 | 12 | 10 | 26 | 8 | 14 | 10 | 55 |

The ink 8 using an alcohol compound (octydodecanol) having a viscosity of 50 mPa·s at 25 degrees C. had an ink viscosity of 55 mPa·s at 25 degrees C. and was not inkjet-dischargeable. Therefore, evaluations presented in Table 2 to Table 4 below were not performed (unmeasurable).

For example, the product names and the supplier names of the components used for producing the inks presented in Table 1 are as follows.

—Alcohol Compound—
Polyethylene glycol monomethyl ether (with a boiling point of from 290 degrees C. through 310 degrees C.

—Surfactant—
PIONINE A-51-B (anionic surfactant, available from Takemoto Oil & Fat Co., Ltd.)
ZONYL FS-300 (nonionic surfactant, available from Du Pont Kabushiki Kaisha)

<Base Material>

A polyethylene terephthalate (PET) film (available from Toyobo Co., Ltd., an ester film E5100, with a thickness of 100 micrometers) was used as a base material and any adhesive liquid described below was applied over a corona treatment-applied surface of the PET film, to form an adhesive section over the base material.

Adhesive Liquid Preparation Example 1

—Preparation of Adhesive Liquid 1—

A dispersion of a polycarbonate polyurethane resin (available from Covestro Japan Ltd., IMPRANIL DLC-F, with a solid concentration of 40% by mass) (95% by mass) and a HDI-based hydrophilic group-containing polyisocyanate solution (available from Covestro Japan Ltd, BAYHYDUR 3100, with a solid concentration of 100% by mass) (5% by mass) were mixed with each other, to prepare an adhesive liquid 1.

Adhesive Liquid Preparation Example 2

—Preparation of Adhesive Liquid 2—

A polyurethane resin compound (available from Covestro Japan Ltd., DESMOPHEN 670BA, with a solid concentration of 80% by mass) (28% by mass), a HDI-based isocyanate solution (available from Covestro Japan Ltd, DESMODUR N3790BA, with a solid concentration of 90% by mass) (14% by mass), and ethyl acetate (58% by mass) were mixed with one another, to prepare an adhesive liquid 2.

Adhesive Liquid Preparation Example 3

—Preparation of Adhesive Liquid 3—

A hydroxyl group-containing polyester polyurethane resin compound (available from Covestro Japan Ltd., BAYHYDROL U355, with a solid concentration of 55% by mass) (95% by mass) and a HDI-based hydrophilic group-containing polyisocyanate solution (available from Covestro Japan Ltd, BAYHYDUR 3100, with a solid concentration of 100% by mass) (5% by mass) were mixed with each other, to prepare an adhesive liquid 3.

Adhesive Liquid Preparation Example 4

—Preparation of Adhesive Liquid 4—

A hydroxyl group-containing acrylic resin compound (available from Covestro Japan Ltd., BAYHYDROL A2427, with a solid concentration of 41% by mass) (95% by mass) and a hydrophilic group-containing polyisocyanate solution (available from Covestro Japan Ltd, BAYHYDUR 3100, with a solid concentration of 100% by mass) (5% by mass) were mixed with each other, to prepare an adhesive liquid 4.

Adhesive Liquid Preparation Example 5

—Preparation of Adhesive Liquid 5—

A 1K-type block HDI-based isocyanate (available from Covestro Japan Ltd., DESMODUR BL3872, with a solid concentration of 60% by mass) was diluted 5 fold with MEK (methyl ethyl ketone), to prepare an adhesive liquid 5.

Adhesive Liquid Preparation Example 6

—Preparation of Adhesive Liquid 6—

An adhesive liquid 6 was prepared in the same manner as in Adhesive liquid preparation example 1, except that unlike in Adhesive liquid preparation example 1, the HDI-based hydrophilic group-containing polyisocyanate solution (available from Covestro Japan Ltd., BAYHYDUR 3100, with a solid concentration of 100% by mass) was changed to an IPDI-based hydrophilic group-containing polyisocyanate solution (available from Covestro Japan Ltd., BAYHYDUR 401-70, with a solid concentration of 70% by mass).

Adhesive Liquid Preparation Example 7

The dispersion of the polycarbonate polyurethane resin (100% by mass) of Adhesive liquid preparation example 1 except the HDI-based hydrophilic group-containing polyisocyanate solution was produced as an adhesive liquid 7.

The adhesive liquid 7 did not express adhesiveness with any of the inks. Therefore, evaluations presented in Table 2 to Table 4 below were not performed (unmeasurable).

Example 1

—Production of Medium—

The adhesive liquid 1 was applied over a corona treatment-applied surface of a PET film serving as a base material by roll coating as an adhesive liquid supplying apparatus, to have a thickness of 5 micrometers, to form an adhesive section.

Next, image patterns having image area ratios of 20%, 50%, and 100% were printed over the adhesive section formed over the PET film using an inkjet apparatus (available from Tritek Co., Ltd., ONEPASS JET) mounted with an inkjet head (MH5420, available from Ricoh Company, Ltd.), and subsequently dried with hot air (at 110 degrees C. for 2 minutes), to produce a medium of Example 1.

Examples 2 to 11 and Comparative Examples 2 to 6

—Production of Medium—

Media of Examples 2 to 11 and Comparative Examples 2 to 6 were produced in the same manner as in Example 1, except that unlike in Example 1, the combination of the ink and the adhesive liquid was changed as presented in Table 2 to Table 4.

Comparative Example 1

—Production of Medium—

A medium of Comparative Example 1 was produced using a polyethylene terephathalate (PET) film including no adhesive section (available from Toyobo Co., Ltd., an ester film E5100, with a thickness of 100 micrometers) as is as a base material.

Next, various properties of the obtained media of Examples 1 to 11 and Comparative Examples 1 to 6 were evaluated in the manners described below. The results are presented in Table 2 to Table 4.

<Laminate Treatment>

The printed surface of each of Examples 1 to 11 and Comparative Examples 1 to 6 was overlapped with a corona treatment-applied surface of a cast polypropylene (CPP) film having a thickness of 70 micrometers (available from Toray Synthetic Film K.K., TORAYPHANE NO-ZK62) to be laminated under nipping conditions of 60 degrees C. and 2 kg/cm², and aged at 40 degrees C. for 3 days, to produce a laminate sample of each.

Laminate treatment conditions may be appropriately selected depending on the kind of the laminate material. The heating unit, the heating temperature, and the heating time are the same as in the heating step. By lamination, a medium in which the base material and the print section, or the base material, the adhesive section, and the print section are firmly integrated with the laminate material can be obtained.

<Evaluation of Adhesiveness>

Adhesiveness of each medium before lamination was evaluated according to a JIS K5400 cross-cut adhesion test (old standard). An adhesiveness of 100 in the evaluation criteria described below means that not even one of a hundred grid squares obtained by cutting peeled away. An adhesiveness of 70 means that the area of unpeeled grid squares accounted for 70%. The level B or A is a practically usable level.

[Evaluation Criteria]
A: The adhesiveness was 80 or greater but 100 or less.
B: The adhesiveness was 70 or greater but less than 80.
C: The adhesiveness was less than 70.

<Evaluation of Laminate Strength>

Each laminate sample produced was cut into a strip shape having a size of 2 cm×10 cm in a manner to have a 1 cm non-laminated portion at one end as an exposed core for peel strength measurement, and subjected to peel strength measurement in an atmosphere of 25 degrees C. This test was conducted five times to obtain the average, which was evaluated according to the criteria described below. The level B or A is a practically usable level.

[Evaluation Criteria]
A: The peel strength was 1 N or greater.
B: The peel strength was 0.5 N or greater but less than 1 N.
C: The peel strength was less than 0.5 N.

<Evaluation of Yellowing>

Each laminate sample produced was irradiated with ultraviolet rays for 60 hours using an ultraviolet auto fadeometer (available from Suga Test Instruments Co., Ltd., model type: UA48AUHB), to measure yellowing (ΔE) of the adhesive section between before and after irradiation using X-RITE 939 (available from X-Rite Inc.). The level B or A is a practically usable level.

[Evaluation Criteria]
A: ΔE was less than 3.
B: ΔE was 3 or greater but less than 5.
C: ΔE was 5 or greater.

<Evaluation of Ink Discharging Stability>

Each ink was loaded in an inkjet apparatus (available from Tritek Co., Ltd., ONE PASS JET) mounted with an inkjet head (MH5420, available from Ricoh Company, Ltd.), and discharged continuously for 30 minutes at 20 kHz. Subsequently, the ink was left to stand still in a room temperature environment (with a temperature of 23 degrees C. and a relative humidity of 55%) for 30 minutes with the nozzle surface of the inkjet head uncapped. Subsequently, the discharging condition was visually observed according to the evaluation criteria described below. The level C, B, or A is a practically usable level.

[Evaluation Criteria]
A: Abnormal discharging (clogged nozzles, bending, and velocity anomaly) was not observed at all.
B: A slight bending and velocity anomaly were observed although there was no nozzle clogged.
C: There were some nozzles clogged, and bending and velocity anomaly were observed.
D: There were many nozzles clogged, and bending and velocity anomaly were observed frequently.

TABLE 2

| | | Ex. | | | | | |
|---|---|---|---|---|---|---|---|
| | | 1 | 2 | 3 | 4 | 5 | 6 | 7 |
| Ink No. | | 1 | 1 | 1 | 1 | 1 | 2 | 3 |
| Boiling point (° C.) of alcohol compound | | 290 to 310 | 290 to 310 | 290 to 310 | 290 to 310 | 290 to 310 | 274 | 242 |
| Viscosity (mPa·s) of alcohol compound at 25° C. | | 14.8 | 14.8 | 14.8 | 14.8 | 14.8 | 7.3 | 5.5 |
| Adhesive supplying apparatus | | Present | Present | Present | Present | Present | Present | Present |
| Adhesive liquid No. | | 1 | 2 | 3 | 4 | 5 | 1 | 1 |
| Evaluation result | Adhesiveness | B | A | A | A | A | B | B |
| | Laminate strength | A | A | A | A | A | A | A |
| | Yellowing (ΔE) | A | A | A | A | A | A | A |
| | Discharging stability | A | A | A | A | A | B | B |

TABLE 3

| | | Ex. | | | |
|---|---|---|---|---|---|
| | | 8 | 9 | 10 | 11 |
| Ink No. | | 4 | 5 | 6 | 1 |
| Boiling point (° C.) of alcohol compound | | 243 | 188 | 276 | 290 to 310 |
| Viscosity (mPa·s) of alcohol compound at 25° C. | | 23.8 | 1.1 | 9.7 | 14.8 |
| Adhesive supplying apparatus | | Present | Present | Present | Present |
| Adhesive liquid No. | | 1 | 1 | 1 | 6 |
| Evaluation result | Adhesiveness | B | B | B | B |
| | Laminate strength | A | A | A | B |
| | Yellowing (ΔE) | A | A | A | B |
| | Discharging stability | B | C | A | A |

TABLE 4

|  |  | Comp. Ex. | | | | | |
| --- | --- | --- | --- | --- | --- | --- | --- |
|  |  | 1 | 2 | 3 | 4 | 5 | 6 |
| Ink No. | | 1 | 7 | 7 | 7 | 7 | 7 |
| Boiling point (° C.) of alcohol compound | | 290 to 310 | 178 | 178 | 178 | 178 | 178 |
| Viscosity (mPa·s) of alcohol compound at 25° C. | | 14.8 | 8 | 8 | 8 | 8 | 8 |
| Adhesive supplying apparatus | | Absent | Present | Present | Present | Present | Present |
| Adhesive liquid No. | | Absent | 1 | 2 | 3 | 4 | 5 |
| Evaluation result | Adhesiveness | * | B | A | A | A | A |
|  | Laminate strength | * | B | B | B | B | B |
|  | Yellowing (ΔE) | * | A | A | A | A | A |
|  | Discharging stability | A | D | D | D | D | D |

The "*" marks of Comparative Example 1 in Table 4 mean that the properties were unmeasurable because the ink failed to react and solidify.

From the results of Table 2 to Table 4, the media of Examples 1 to 11 were confirmed to have a good adhesiveness and a good laminate strength and to be able to be prevented from yellowing. Moreover, addition of an alcohol compound having a boiling point of 180 degrees C. or higher and a viscosity of 30 mPa·s or lower at 25 degrees C. succeeded in improving discharging stability of the inks. Particularly, Examples 1, 2, 3, 4, 5, 10, and 11 using polyethylene glycol monomethyl ether, which was an alcohol compound having a boiling point of 290 degrees C. or higher and a viscosity of 30 mPa·s or lower at 25 degrees C., achieved an even better discharging stability of the inks.

Because using an adhesive liquid containing an IPDI-based isocyanate compound, Example 11 had a slightly poor suppression of yellowing. Examples 1 to 10 using an adhesive liquid containing a HDI-based isocyanate compound succeeded in suppression of yellowing.

As regards discharging stability of the inks, Examples 1 to 11 succeeded in suppression of solvent volatilization near the interface to the air in the nozzles by using an alcohol compound having a boiling point of 180 degrees C. or higher and a viscosity of 30 mPa·s or lower at 25 degrees C., and had no troubles such as nozzle clogging.

It was also confirmed that even when a different laminate material was used, the same effects as in Example 1 were achieved so long as the configuration of claim 1 of the present disclosure was satisfied.

In Comparative Example 1, the base material did not previously include an adhesive section containing an isocyanate compound, and this base material was used as is. Therefore, the ink failed to react and solidify, and adhesiveness, laminate strength, and yellowing were unmeasurable.

Comparative Examples 2 to 6 were expected to be practically usable in terms of adhesiveness and suppression of yellowing, but had clogging at many nozzles and frequent bending and velocity anomaly in terms of discharging stability of the inks. Hence, Comparative Examples 2 to 6 were confirmed to be unpromising for practical use.

The ink 8 using an alcohol compound having a viscosity higher than 30 mPa·s at 25 degrees C. was not inkjet-dischargeable, and measurement of properties was impossible.

Further, when the adhesive section was free of an isocyanate compound like the adhesive liquid 7, adhesiveness was not expressed by combination with any of the inks. Therefore, measurement of properties was impossible.

Aspects of the present disclosure are, for example, as follows.

<1> A medium including:
a base material; and
a print section over the base material,
wherein the print section contains an alcohol compound having a boiling point of 180 degrees C. or higher and a viscosity of 30 mPa·s or lower at 25 degrees C., and
wherein the medium includes an adhesive section containing an isocyanate compound.

<2> The medium according to <1>,
wherein the print section is a section formed through cross-linking between the isocyanate compound and the alcohol compound.

<3> The medium according to <1>,
wherein the adhesive section is a section to be provided over the base material, and the print section is a section to be formed over the adhesive section along with the providing of the adhesive section.

<4> The medium according to any one of <1> to <3>,
wherein the isocyanate compound has a hexamethylene diisocyanate (HDI) structure.

<5> The medium according to any one of <1> to <4>,
wherein the alcohol compound is at least one selected from the group consisting of polyethylene glycol monomethyl ether, tripropylene glycol methyl ether, propylene glycol phenyl ether, dipropylene glycol monomethyl ether, and tripropylene glycol monobutyl ether.

<6> The medium according to any one of <1> to <5>, including
a laminate section formed of a laminate material over the print section.

<7> A medium producing method including:
applying an ink over a base material to form a print section, the ink containing an alcohol compound having a boiling point of 180 degrees C. or higher and a viscosity of 30 mPa·s or lower at 25 degrees C.; and
heating the base material over which the print section is formed.

<8> The medium producing method according to <7>,
wherein the base material includes an adhesive section containing an isocyanate compound.

<9> The medium producing method according to <7>, including
applying an adhesive liquid containing an isocyanate compound over the base material to form an adhesive section.

<10> The medium producing method according to <8> or <9>,
wherein the isocyanate compound has a hexamethylene diisocyanate (HDI) structure.

<11> The medium producing method according to any one of <7> to <10>,
wherein the applying the ink is performed by an inkjet method.

<12> The medium producing method according to any one of <7> to <11>, including
heating and pressing a laminate material over the print section to form a laminate section.

<13> A medium producing apparatus including:
a print section forming unit configured to apply an ink over a base material to form a print section, the ink containing an alcohol compound having a boiling point of 180 degrees C. or higher and a viscosity of 30 mPa·s or lower at 25 degrees C.; and
a heating unit configured to heat the base material over which the print section is formed.

<14> The medium producing apparatus according to <13>,
wherein the base material includes an adhesive section containing an isocyanate compound.

<15> The medium producing apparatus according to <13>, including
an adhesive section forming unit configured to apply an adhesive liquid containing an isocyanate compound over the base material to form an adhesive section.

<16> The medium producing apparatus according to <13> or <14>,
wherein the print section forming unit is an inkjet head.

<17> The medium producing apparatus according to any one of <13> to <16>,
wherein the isocyanate compound has a hexamethylene diisocyanate (HDI) structure.

<18> The medium producing apparatus according to any one of <13> to <17>,
wherein the print section forming unit is an inkjet head.

<19> The medium producing apparatus according to any one of <13> to <18>, including
a laminate section forming unit configured to heat and press a laminate material over the print section to form a laminate section.

The medium according to any one of <1> to <6>, the medium producing method according to any one of <7> to <12>, and the medium producing apparatus according to any one of <13> to <19> can solve the various problems in the related art and can solve the object of the present disclosure.

What is claimed is:

1. A method for producing a medium, comprising:
applying an ink over a base material to form a print section, wherein the ink comprises an alcohol compound having a boiling point of 180 degrees C. or higher and a viscosity of 30 mPa·s or lower at 25 degrees C.; and
heating the base material over which the print section is formed such that the alcohol compound in the ink does not evaporate.

2. The method according to claim 1,
wherein the base material comprises an adhesive section that comprises an isocyanate compound.

3. The method according to claim 2,
wherein the isocyanate compound has a hexamethylene diisocyanate (HDI) structure.

4. The method according to claim 1, further comprising:
applying an adhesive liquid that comprises an isocyanate compound over the base material to form an adhesive section.

5. The method according to claim 1,
wherein the applying the ink is performed by an inkjet method.

6. The method according to claim 1, further comprising:
heating and pressing a laminate material over the print section to form a laminate section.

7. An apparatus comprising:
a print section forming unit configured to apply an ink over a base material to form a print section, wherein the ink comprises an alcohol compound having a boiling point of 180 degrees C. or higher and a viscosity of 30 mPa·s or lower at 25 degrees C.; and
a heating unit configured to heat the base material over which the print section is formed such that the alcohol compound in the ink does not evaporate.

8. The apparatus according to claim 7, further comprising:
an adhesive section forming unit configured to apply an adhesive liquid that comprises an isocyanate compound over the base material to form an adhesive section.

9. The apparatus according to claim 8, wherein the adhesive section forming unit comprises an adhesive liquid supplying unit containing the adhesive liquid.

10. The apparatus according to claim 7,
wherein the print section forming unit is an inkjet head.

11. The apparatus according to claim 7, further comprising:
a laminate section forming unit configured to heat and press a laminate material over the print section to form a laminate section.

* * * * *